Patented Aug. 28, 1923.

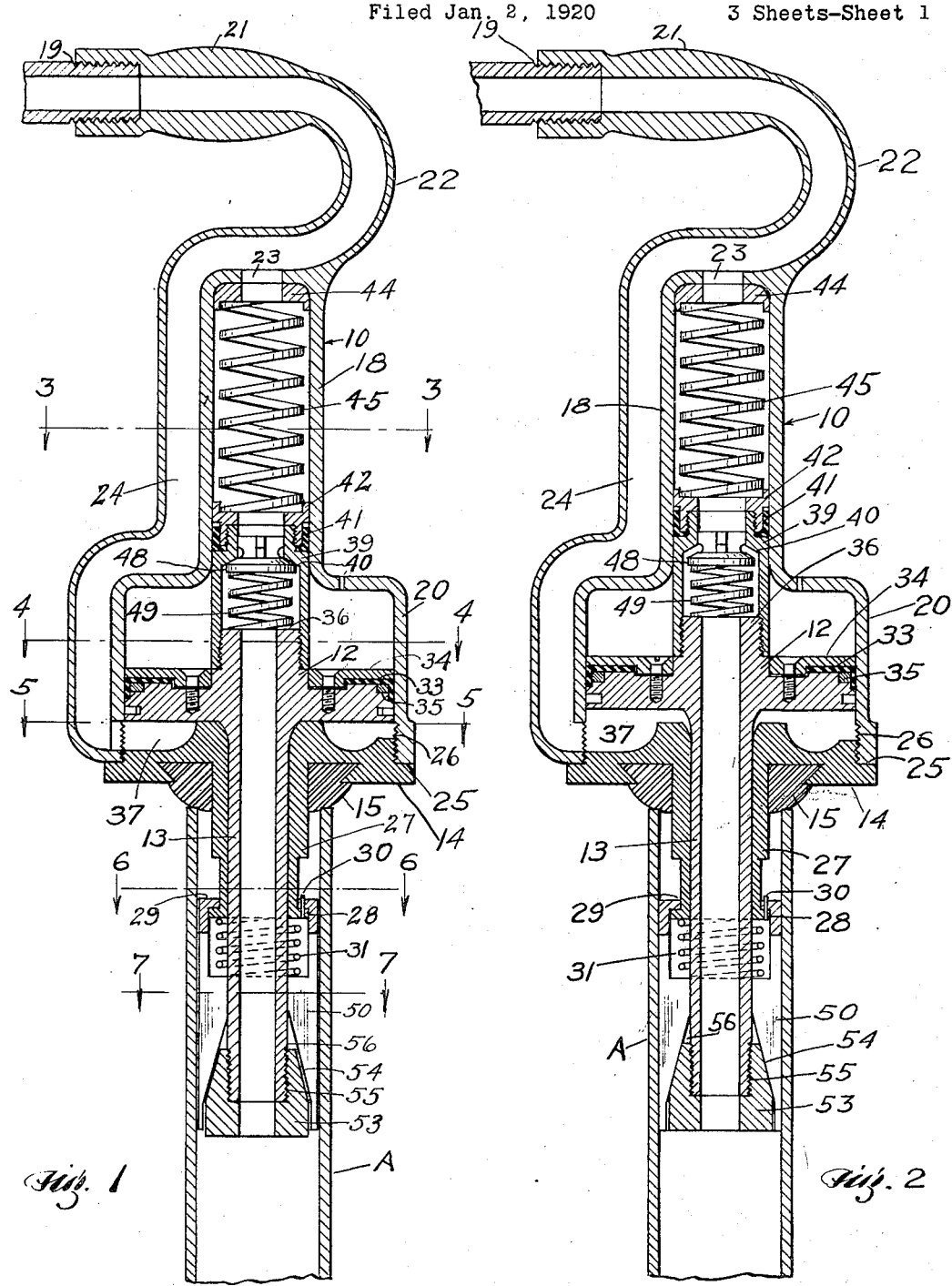

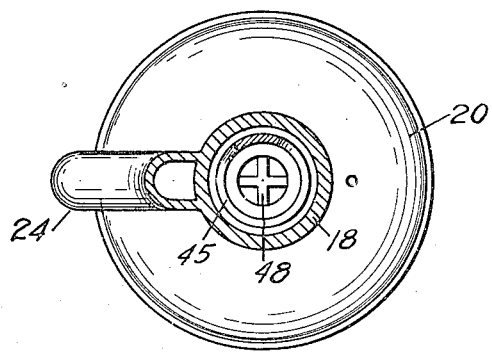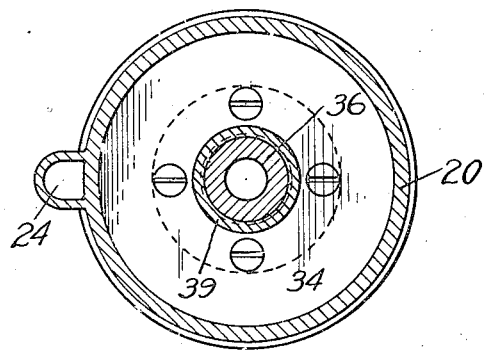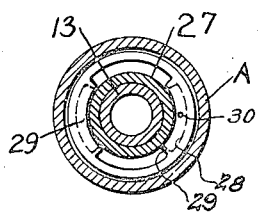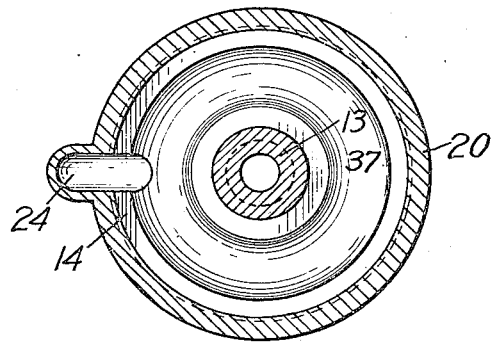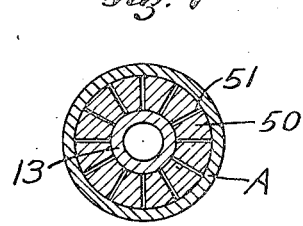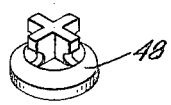

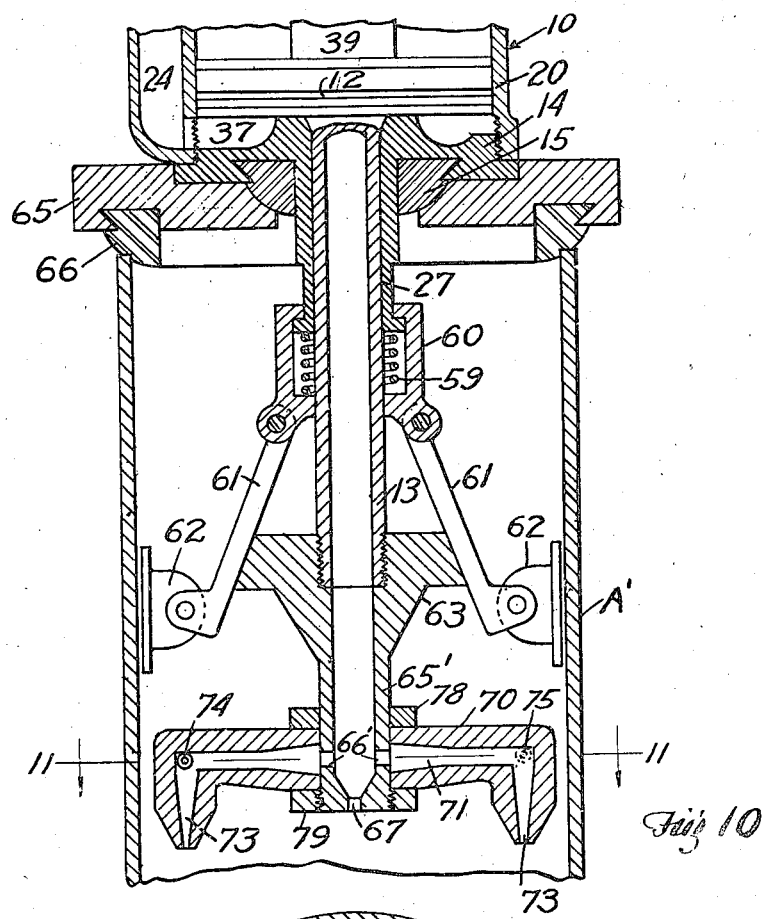
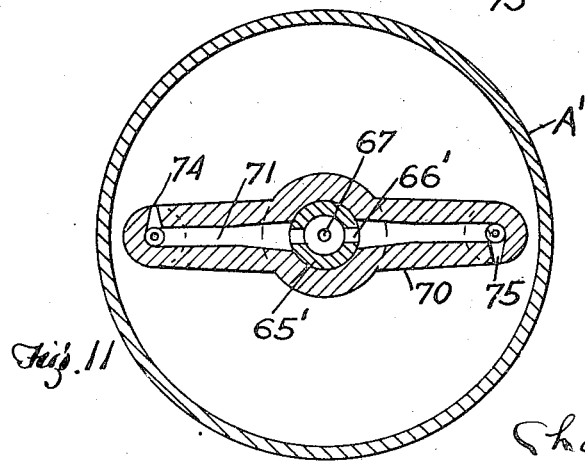

1,466,450

UNITED STATES PATENT OFFICE.

CHARLES A. KOTHE, OF GALION, OHIO, ASSIGNOR OF ONE-THIRD TO CHARLES JAMES, OF YOUNGSTOWN, OHIO, AND ONE-THIRD TO WILLIAM SCHLAFGE, OF MEADVILLE, PENNSYLVANIA.

FLUE BLOWING AND TESTING DEVICE.

Application filed January 2, 1920. Serial No. 349,131.

*To all whom it may concern:*

Be it known that I, CHARLES A. KOTHE, residing at Galion, in the county of Crawford and State of Ohio, have invented a certain new and useful Improvement in Flue Blowing and Testing Devices, of which the following is a full, clear, and exact description, reference being had to the accompanying drawings.

My invention relates to a flue cleaning and testing device especially adapted for flues or tubes in a fire-tube boiler. An object of my invention is to provide a device which may be quickly and securely anchored to the tube to be cleaned or tested to prevent the inconvenient and often dangerous "kicking" which frequently results when fluid directed through the usual blowing tool under high pressure strikes suddenly some obstruction. Another object is the provision in such a device of means whereby the fluid under pressure automatically effects the anchoring of the device when it is inesrted into the tube to be cleaned. Other objects and advantages appear in the following specification and the essential characteristics are summarized in the claims.

My invention is illustrated in the accompanying drawings, forming part of this application, in which Fig. 1 is a central longitudinal section through my device loosely inserted in the end portion of the tube to be cleaned; Fig. 2 is a similar view after the fluid has been admitted, showing the device in its anchored or clamped position; Figs. 3, 4, 5, 6 and 7 are transverse sections on the correspondingly numbered lines on Fig. 1; Fig. 8 is a perspective view of the valve employed in my device; Fig. 9 is an elevation of the expansible shell forming part of the clamping means shown in Figs. 1 and 2; Fig. 10 is a central longitudinal section through a modified form of clamping means adaptable for larger tubes; and Fig. 11 is a transverse section on the line 11—11 of Fig. 10.

Referring to the drawings by numerals, 10 designates the body of my device which is adapted to be applied to an open end of the tube or flue. These tubes are generally horizontal, or nearly so, when in normal position in use, and may also be so when being supported for testing, but for convenience of illustration they have been shown arranged vertically, with the tool inserted downwardly into the upper end. It will be understood, however, that the device may be applied to the tube in any convenient position. The body 10 contains a hollow piston 12 having a tubular stem 13 adapted to slide through a removable cap or cover 14. This cover carries a rubber gasket or plug 15 adapted to be applied to the end of the flue or tube A to be cleaned. The stem and cover carry at their inner ends expanding means hereinafter described, for clamping the device to the flue or tube.

As shown in Figs. 1 and 2, the body 10 comprises a shell 18 having an enlarged portion 20 and a tube 22 adapted to be removably secured, as at 19, to a suitable supply pipe. The tube 22 constitutes means for admitting fluid to the shell, and may be curved in substantially the manner shown, to form a handle 21 for the device. Some suitable shut-off cock, not shown, is provided either in the handle or beyond it, as desired. The tube 22 is continued beyond an outer orifice 23 which opens into the shell 18, to constitute a by-pass 24 leading to a chamber 37 at the inner open end of the enlarged portion 20.

The cover or cap 14 is preferably provided with a reduced shoulder 25 externally threaded to engage an internal thread 26 on the inner end of the enlarged portion 20. Extending laterally from both sides of the cover 14 and preferably rigid therewith is a hub or sleeve, the inner end 27 of which is adapted to be inserted into the tube A and carry a portion of the expanding means for clamping the device therein, and through which sleeve the piston stem 13 is adapted to slide. The outer end 31 constitutes a stop against which the piston 12 is normally pressed into engagement.

The clamping device, whether of the form shown in Figs. 1 and 2 or that shown in Fig. 10, is carried by the inner end of the sleeve 27 around the stem 13. This clamping device is secured in place by a breech lock connection illustrated in Fig 6. That is to say, on the inner end of the sleeve 27 is a notched collar 28 and the clamping member overhangs this collar by a similarly notched flange 29. The notches are of greater extent than the remaining flange portions of the members, so that the parts may be readily separated or joined when the notches of the one member align with the flanges of the other. A pin 30 carried by one of these members normally engages a hole in the other and prevents independent rotation, and a compression spring 31 maintains the members in engagement. Inward movement, however, of the clamping member will compress the spring and separate the engagement of the pin and hole, and then a partial rotation of the clamping member will bring it in position where it may be drawn off of the sleeve. The loose play between the clamping device and the instrument body, in conjunction with the light spring 31, has another function hereinafter described.

The piston 12 within the enlarged portion 20 of the shell is normally spring pressed into engagement with the outer end of the chamber bounded by the cover or cap 14. This piston is provided with suitable packing 33 held by the annular plate 34, and may have suitable piston rings 35. The stem 13 referred to is rigid with the piston and may be formed integral therewith. On the opposite side of the piston is a hub 36 which is preferably screw-threaded and receives a sleeve 39, the other end of which is formed into a conical valve seat 40 adjacent to a reduced portion. This reduced end of the sleeve 39 carries suitable packing 41 having a snug sliding fit within the shell portion 18. This packing may be held by a screw-threaded cap 42, the upper surface of which is shown as formed as a seat for the helical spring 45, this spring being pressed between this seat and a cap 44 at the outer end of the chamber 18.

Within the sleeve 39 and seating against the conical valve seat is a conical valve 48 pressed toward its seat by a spring 49, the inner end of which bears against the hub 36.

Before proceeding to a description of the clamping means, two forms of which are shown, it may be stated that the characteristic of these clamping means is that longitudinal movement of the piston toward the handle 21 forces the clamping means outwardly into engagement with the tube. Thus, when the device is put into a tube, fluid under pressure is more or less suddenly admitted to the hollow handle. This fluid, being conducted through the by-pass 24 into the chamber 37 and acting on the comparatively large annular area of the piston, forces it outward, as shown in Fig. 2, and thus spreads the clamping device to anchor the instrument within a tube. When the piston can move no farther outwardly, the pressure in the chamber 37 forces the head 14 inwardly to cause the gasket 15 to make a very tight connection with the end of the flue. This is allowed by the loose play between the clamping device and the instrument sleeve 27; the light spring 31 readily yielding to this external fluid pressure. Thereafter as the pressure builds up it acts through the opening 23 against the smaller area of the valve 48 opening it against its spring 49 and allowing fluid to pass through the tubular stem 13 into the tube to be cleaned.

The clamping means illustrated in Fig. 1 is adaptable for small tubes, and comprises the expanding sleeve 50 alternately slotted from opposite ends as at 51, as shown in Fig. 9, to form a plurality of segments or tongues which are adapted to be expanded against the inner wall of the tube A by an expanding plug 53 secured to the inner end of the stem 13 and having a conical portion 54 engaging the corresponding internally tapered end 56 of the expanding sleeve 50. The cone 53 is preferably screw-threaded as at 55 to the end of the hollow plunger 13.

It will be seen from the above description that whenever fluid under pressure acts on the piston 12 it draws the cone into the sleeve and expands it against the tube, thus bringing it in the position shown in Fig. 2. This forms an effective clamping of the device against the tube.

Fig. 10 illustrates a toggle form of clamping device adapted particularly for larger tubes A' and operated by the same movement of the piston. In this case all of the tool except the clamping device is the same as heretofore described. The inner end of the casing sleeve 14 instead of carrying the split sleeve 50, carries a box-like collar 60 housing the spring 59 and having pivoted to it a pair of arms 61, to the other ends of which are pivoted shoes 62. The cone 63 on the end of the stem 13 engages the inner faces of the arms 61 and when drawn outwardly by operation of the stem 13 serves to force the arms outwardly, causing the shoes to engage the tube. The tool may be connected to the large tube A' by an adapter 65 secured to the cap 14 over the gasket 15 and itself carrying a gasket or plug 66 of a size corresponding to the opening in the tube.

Figs. 10 and 11 illustrate a rotary nozzle adapted to convey the cleaning fluid from the central stem to points near the inner surface of the tube to be cleaned. Thus the cone 63 has a tubular extension 65' with a central bore continuing the bore of the stem 13, and lateral orifices 66', as well as preferably an axial orifice 67. Surrounding this extension 65 at the orifice is a rotary head 70 which has passageways 71 terminating in longitudinal nozzles 73, and also in oppositely directed lateral nozzles 74 and 75. The fluid ejected through these latter nozzles reacts to cause the head 70 to revolve and thus the fluid emitted through the openings 73 is directed along successively different portions of the tube to be cleaned, thereby cleaning the entire tube. The head 70 may be positioned on the stem 65 in any convenient manner. I have shown it as guided between a collar 78 on the tube and a nut 79 screwing onto the end portion thereof.

In operation the body 10 carrying the movable piston 12 with its stem 13 sliding through the cap 14—the piston and cap having expanding elements such as shown in Figs. 1 or 10 on their inner ends—is inserted into the end of a tube A or A' to be cleaned. The outer end 21 of the body 10 is connected at 19 to the inlet pipe containing the cleaning fluid, whether water, steam or compressed air, which is then admitted into the tube 22. The fluid will immediately fill the shell portion 18 as well as the chamber 37 and connected therewith by the by-pass 24 and on acount of the much larger area of the piston 12 than of the valve 48 and cap 42 compresses the spring 45 and expands the clamping device against the inner wall of the tube. Immediately following this, the instrument body moves toward the flue so that the gasket 15 forms an air-tight engagement with the end of the flue. When the pressure reaches a predetermined amount, the outward pressure against the valve 48 will be overcome, and the spring 49 and the valve will be forced inwardly permitting the fluid to pass directly through the opening 23 into and through the hollow piston stem into the tube A or A' which will sweep away the accumulated soot and effect the cleaning operation desired.

When steam is used as the fluid it is desirable to suitably insulate the handle 21 so that it may be more readily grasped by the operator. In that case an insulating sleeve may be placed around this handle, or the handle may be made solid and the passageway 24 begin at the opening 23, a suitable fluid connection being made to this passageway from the supply pipe.

I have explained the device primarily with reference to its use in cleaning soot from flues in boilers, but it may, however, be equally well used for testing the tubes for leaks before they are placed in the boiler. For such use, one end of the tube is closed by a suitable cap or plug, the blowing tool inserted in the other end, and the tube filled. Escape of the fluid through any possible leaks may of course be readily detected. In case compressed air is supplied, the tube may be immersed in liquid. If any bubbles are observed on the liquid it indicates a leak in the tubes; the absence of bubbles demonstrates the tube to be impervious.

I claim:

1. The combination of a conduit adapted to be inserted into the interior of a flue, clamping means adapted to engage the interior of the flue and clamp the conduit thereto, and means, including a piston in the conduit operable by pressure therein, for operating the clamping means.

2. In a device of the character described, the combination, with a conduit adapted to deliver fluid to a flue, of means exterior to the flue whereby the force of the fluid may hold the conduit in communication with the flue.

3. In a device of the character described, the combination with a conduit adapted to deliver fluid to a tube, of means operated by the force of the fluid to hold the conduit in place, and a valve within the conduit thereafter opened by the force of the fluid to admit fluid into the tube.

4. In a device of the character described, the combination of a hollow member adapted to be inserted into a flue, a pressure sensitive member within said hollow member, clamping means carried by said members and operable by said pressure sensitive member means for admitting fluid into said hollow member whereby it is clamped to the flue, the fluid subsequently passing into the flue.

5. A device adapted to have one end inserted into a flue, comprising a cylindrical member having an enlarged portion intermediate its ends, clamping means carried by the end within the tube, a movable member within the enlarged portion connected with said clamping means, means whereby fluid may be admitted to said device and actuate said movable member to anchor the device to the tube, and means including a spring pressed valve whereby the fluid may subsequently pass into the tube.

6. The combination of a conduit, a flue, clamping means adapted to engage the interior of the flue and hold the conduit in communication therewith, said means comprising an expansible member, a piston, and means associated with the expansible member and piston for urging said member into contact with the tube when the piston is moved in one direction.

7. The combination of a conduit, a flue, clamping means for holding the conduit to the flue, said means comprising a movable member, a wedge member rigid therewith, and means operable by said wedge member for gripping the wall of the flue.

8. In a device of the character described, a hollow body adapted to be inserted into a tube or flue to be cleaned, a piston therein, cooperating clamping members carried by the body and piston, means whereby fluid may be admitted to said body to cause movement of the piston and operative engagement of the clamping members against the tube, and means including a spring pressed valve whereby the fluid may subsequently force its way through the device into the tube.

9. In a device of the character described, a hollow body having an enlarged central portion and reduced cylindrical ends, a hollow piston within said central portion having tubular extensions within said reduced ends of the body, cooperating clamping members carried by one of said ends and the adjacent extension respectively, means whereby fluid may be admitted to said device under increasing pressure whereby when first admitted the piston is moved outwardly to cause the engagement of the clamping means against the inner wall of the tube, and then passes directly thru the device into the tube.

10. In a device of the character described, a hollow body having an enlarged central portion and reduced cylindrical ends, a hollow piston within said central portion having tubular extensions within said reduced ends of the body, cooperating clamping members carried by one of said ends and the adjacent extension respectively, means whereby fluid may be admitted to said device directly through one end to one side of the piston and through a by-pass to the other side having a larger area whereby when first admitted the piston is moved outwardly to cause the engagement of the clamping means against the tube and later passes directly through the opening in the piston into the tube.

11. A device of the character described adapted to have one end inserted into a flue, comprising a cylindrical member having an enlarged portion intermediate its ends, clamping means carried by the end within the tube, means within the enlarged portion connected with said clamping means, means whereby fluid may be admitted to said device through the other end, the latter constituting a handle for the device, and means whereby the fluid will first move said member and operate said clamping means to lock the device to the tube, and subsequently pass into the tube.

12. In a device of the character described, a hollow body having an enlarged central portion and reduced ends, one of which is adapted to be inserted into a tube or flue to be cleaned, a piston within the enlarged portion urged toward its inner end but spaced therefrom to constitute a chamber, cooperating clamping members carried by the last mentioned end of the body and said piston, means whereby fluid may be admitted to said chamber to cause movement of the piston and operative engagement of the clamping members against the inner wall of the tube, and means whereby the fluid may subsequently force its way through the device into the tube.

13. In a device of the character described, the combination of a conduit, means for clamping it to a tube, a pressure-responsive device for operating said means, a valve movable by fluid pressure to open communication through said conduit to the interior of the tube, said pressure-responsive device having a larger area than said valve exposed to fluid pressure.

14. A device of the character described comprising a cylindrical member adapted to be inserted into a tube, a hollow piston carried within said member, a spring pressed valve normally closing the opening throu said piston, an expanding element carried by the end of the body within the tube, means connected with said piston whereby its movement in one direction causes said expanding member to be clamped against the inner wall of the tube, means for admitting fluid to both sides of the piston over a greater area on one side than on the other, whereby the clamping means is moved to operative position and means whereby fluid under increased pressure overcomes the resistance of said valve and forces its way directly into the tube.

15. A device of the character described comprising a member adapted to be inserted into a tube a hollow piston carried within said member, a valve normally closing the opening through said piston, an expanding element carried by the end of the body within the tube means connected with said piston whereby its movement in one direction causes said expanding member to be clamped against the inner wall of the tube, means for admitting fluid to the piston whereby the clamping means is moved to operative position, and means whereby fluid under increased pressure overcomes the resistance of said valve and forces its way directly into the tube.

16. A device of the character described comprising a hollow body having an enlarged portion at one end, a removable cap therefor having an opening and a sleeve surrounding the opening, a piston fitted within said enlarged portion having a tubular stem projecting through said sleeve, a clamping device comprising an expanding member secured to the end of said stem and sleeve, means for admitting fluid to said body to cause movement of said piston and engagement of said clamping means against the inner wall of the tube, and means whereby the fluid under increased pressure passes through said piston and stem into the tube.

17. A device of the character described comprising a hollow body having a reduced end adapted to be inserted into a tube, the other end being also reduced and terminating in a hollow handle, a hollow piston carried by said body having a tubular stem slidably mounted within the end within the tube, cooperating clamping members carried by the body and the stem, a sleeve carried by the piston on the opposite side slidably mounted within the body, a valve normally spring closed against a corresponding valve seat in the end of said sleeve, means for conducting fluid to the piston, whereby the piston and clamping means are moved to cause the engagement of the latter securely against the tube, and means whereby fluid under increased pressure may subsequently open said valve and pass into the tube.

18. A device of the character described comprising a hollow body having reduced ends, one of which is adapted to be inserted into a flue, a hollow piston carried by said body having a tubular stem on one side slidably mounted within said end, cooperating clamping members carried by the end of the body and the stem, a sleeve carried by the piston on the opposite side slidably mounted within the other reduced end of the body, a conical valve normally spring closed against a corresponding valve seat in the end of said sleeve, means for conducting fluid to the piston, the side adjacent to the clamping means having a larger area than the other whereby the piston and clamping means are moved to cause the engagement of the latter securely against the flue, and means whereby fluid under increased pressure may subsequently open said valve and pass directly through the device into the flue.

19. In a device of the character described a hollow body having an end adapted to be inserted into a flue to be cleaned, an expansible member removably secured to said end, a hollow piston having a tubular stem slidable within said body, a member having an opening carried by the end of said stem and adapted when the piston is moved in one direction to engage the expansible member and clamp the same to the flue, and means for admitting fluid to said body whereby the piston is first moved to effect the clamping operation and thereafter the fluid under increased pressure passes through the piston and stem into the flue.

20. In a device of the character described a hollow body having an end adapted to be inserted into a flue to be cleaned, an expansible member removably secured by a breech lock connection with the end of said body, a hollow piston having a tubular stem slidable within said body, a member carried by the end of said stem adapted when the piston is moved in one direction to engage the expansible member and clamp the same to the inner wall of the flue, and means for admitting fluid to said body whereby the piston is first moved to effect the clamping operation and thereafter the fluid under increased pressure passes into the flue.

21. The combination of a conduit, clamping means adapted to engage the interior of a flue and hold the conduit in communication therewith, means exterior to the flue and responsive to fluid pressure for operating the clamping means, and means for controlling the passage of fluid through the conduit.

22. The combination of a conduit, clamping means adapted to engage the interior of a flue and hold the conduit in communication therewith, and means exterior to the flue and responsive to fluid pressure for operating the clamping means.

23. In combination, a conduit adapted to receive fluid, a flue, clamping means for attaching the conduit to the flue, said clamping means comprising a piston movable by the fluid, a wedge member actuated by movement of the piston, and means actuated by the wedge member for attaching the conduit to the flue.

24. The combination of a conduit adapted to receive fluid, a flue, clamping means comprising a piston adapted to be moved within the conduit by the fluid, an inclined member rigidly secured to the piston, and an engaging member associated with the inclined member and adapted to grip the flue whenever the piston is moved in one direction.

25. In a device of the character described, the combination of a conduit, means adapted to be positioned within a flue for anchoring the conduit, and means actuated by fluid pressure for thereafter forcing an external portion of the device against the end of the flue to make a tight connection.

26. In a device of the character described, the combination of a conduit adapted to enter a flue, a clamping device carried by the conduit, means for expanding the clamping device within the flue to anchor the inner end of the conduit to the flue, and pneumatic means for forcing the head of the instrument against the end of the flue.

27. In a device of the character described, the combination of a conduit adapted to enter a flue, a clamping device carried by the conduit, means responsive to fluid pressure for expanding the clamping device within the flue to anchor the inner end of the conduit to the flue, and means operated by the same pressure acting in the opposite direction and adapted to be clamped thereby against the end of the flue to make a tight connection.

28. In a device of the character described, the combination of a tubular member adapted to enter a flue, a clamping device adapted to engage the inner wall of the flue to anchor the tubular member therein, a movable head surrounding the tubular member, and a piston and cylinder, one connected with said clamping device and the other with said movable head, whereby fluid pressure may anchor the device and force the end into tight engagement with the flue end.

29. In a device of the character described, the combination of a tubular member, a clamping device, mechanism for expanding the clamping device upon longitudinal movement of a member outside of the flue, and means whereby the instrument may be moved independently of the clamping device toward the flue to obtain a tight connection therewith after the inner end of the instrument has been anchored within the flue.

30. In an instrument of the character described, the combination of a tubular member adapted to enter a flue, mechanism for anchoring the tubular member to the interior of the flue, said mechanism being expanded upon longitudinal movement of said tubular member, a piston and cylinder outside of the flue, one connected with the tubular member and the other with the body of the instrument, said instrument body having a loose play connection with the anchoring mechanism, and means for admitting fluid pressure into said cylinder whereby the instrument may be moved independently of the anchoring device toward the flue to obtain a tight connection therewith after the inner end of the instrument has been anchored within the flue by said fluid pressure.

31. In an instrument of the character described, a body having a head adapted to abut the end of a flue, a member movable longitudinally through the head, an anchoring device adapted to engage the inner wall of the flue, said anchoring device being operated by outward movement of said member, and means for moving said member outwardly, and the head of the device inwardly to lock the instrument tightly to the flue, there being provision for conducting fluid under pressure to the interior of the flue.

32. In a device of the character described, a body having a head adapted to abut the end of a flue, a tubular member movable axially through the head, an anchoring device mounted on the inner portion of the tubular member and adapted to engage the inner wall of the flue, said anchoring device being operated by outward movement of the tubular member, and means for moving said tubular member outwardly and the head of the device inwardly.

33. In a device of the character described, a body having a head adapted to abut the end of a flue, a tubular member movable axially through the head, an anchoring device adapted to engage the inner wall of the flue, said anchoring device being operated by outward movement of the tubular member, a piston and cylinder, one carried by said tubular member and the other rigid with said head, and means for admitting fluid pressure into said cylinder.

34. In a device of the character described, a body having a head carrying a gasket adapted to abut the end of a flue, a tubular member movable axially through the head and gasket, an anchoring device mounted on the inner portion of the tubular member and adapted to engage the inner wall of the flue, said anchoring device being operated by outward movement of the tubular member, a piston and cylinder, one carried by said tubular member and the other rigid with said head, and means for admitting fluid pressure into said cylinder.

35. The combination with a conduit adapted to carry fluid to the interior of a flue, clamping means adapted to engage the interior of the flue and hold the conduit in communication with it, a pressure responsive device exterior to the flue for operating the clamping means, means for admitting fluid to said pressure responsive device, whereby it is actuated to effect the clamping operation, and means whereby the fluid from the same source is thereafter automatically directed through the conduit into the flue.

36. The combination with a conduit, clamping means carried thereby and adapted to engage the interior of the flue and hold the conduit in communication therewith, a pressure responsive device exterior to the flue for operating the clamping means, a passageway leading from a common source to the pressure responsive device and to the portion of the conduit adapted to be in the interior of the flue, and means for maintaining the passageway leading to the interior of the flue closed until after the clamping means has been operated.

37. The combination of a conduit, clamping means carried thereby and adapted to engage the interior of a flue, said conduit extending through the clamping means and having a discharge opening, a pressure responsive device for operating the clamping means, a passageway for fluid leading from a common source to the pressure responsive device and to the discharge passageway respectively, and a spring pressed valve closing the discharge passageway until a predetermined pressure has been attained.

38. In a device of the character described, a body having a head adapted to abut the end of a flue, a tubular member movable axially through the head, an anchoring device mounted on the inner portion of the tubular member and adapted to engage the inner wall of the flue, said anchoring device being operated by outward movement of the tubular member, pressure responsive mechanism adapted when actuated to move the tubular member outwardly and the head inwardly, means for conducting fluid under pressure to said pressure responsive mechanism, and means for thereafter conducting pressure fluid to the interior of said tubular member.

39. In an instrument for blowing flues, the combination of a conduit adapted to admit fluid pressure to the interior of the flue, an anchoring device for the instrument adapted to engage the interior of a flue, a head on the instrument adapted to engage the end of the flue, and means actuated by fluid pressure for first anchoring the instrument and for then forcing the head against the end of the flue and thereafter opening a passageway through the instrument to the interior of the flue.

40. The combination of a valve-controlled conduit, a clamping device, pressure actuated means for operating the clamping device and for forcing the instrument against the end of a flue, and means whereby the pressure may thereafter open the valve, allowing admission to the interior of the flue.

41. The combination of a conduit adapted to carry fluid to the interior of a flue, of a valve for controlling the conduit, fluid pressure actuated means for clamping the conduit in proper position in relation to the flue and for thereafter opening said valve, the clamping means responding to the pressure before said valve is opened thereby.

In testimony whereof, I hereunto affix my signature.

CHARLES A. KOTHE.